United States Patent [19]

Valenti et al.

[11] 4,030,099

[45] June 14, 1977

[54] DIGITAL ANTENNA CONTROL APPARATUS FOR A COMMUNICATIONS TERMINAL

[75] Inventors: James V. Valenti, Laurel, Md.; Herbert Hanft, Alexandria, Va.

[73] Assignee: Westinghouse Electric Corporation, Pittsburgh, Pa.

[22] Filed: Dec. 12, 1974

[21] Appl. No.: 532,277

[52] U.S. Cl. .............................. 343/117 R; 343/7.4
[51] Int. Cl.² ........................ G01S 3/42; G01S 3/44
[58] Field of Search .............. 343/117 R, 7.4, 5 DP

[56] References Cited
UNITED STATES PATENTS

| | | | |
|---|---|---|---|
| 3,718,927 | 2/1973 | Howard et al. | 343/7.4 |
| 3,842,420 | 10/1974 | Rabow | 343/117 R |

Primary Examiner—Maynard R. Wilbur
Assistant Examiner—Richard E. Berger
Attorney, Agent, or Firm—J. B. Hinson

[57] ABSTRACT

Digital control apparatus for automatically slewing i.e. orienting a directive antenna to a quasi-stationary transponder such as a synchronous satellite in orbit above the earth wherein appropriate drive signals for the elevation and/or azimuth axes are provided in response to the received signal from the transponder until the peak or substantially maximum signal strength is sensed. Operationally, digital logic circuitry utilizes the characteristics of the antenna beam pattern to detect the approach toward zero slope near the peak of the pattern to slew the antenna to the peak signal.

12 Claims, 14 Drawing Figures

FIG. 3  LOGIC ELEMENTS

$Q = \overline{S} + E \cdot \overline{dt}$ $\overline{Q} = \overline{R} + \overline{E} \cdot \overline{dt}$

WHERE $\overline{dt}$ IS A TRANSITION FROM "LOW" TO "HIGH" IN A SIGNAL APPLIED TO T

FIG. 4   TIMING DIAGRAM BASIC TIMING LOGIC

DIGITAL ANTENNA CONTROL APPARATUS FOR A COMMUNICATIONS TERMINAL

BACKGROUND OF THE INVENTION

1. Field of the Invention

This invention relates generally to servo systems for controlling the attitude of a controllable receiver antenna and more particularly to binary digital logic circuitry for providing the appropriate drive signals to the antenna drive motors for slewing the antenna to a remote signal source which makes relatively small excursions about a fixed reference point.

2. Description of the Prior Art

When a synchronous satellite is in orbit, it is substantially positioned over the same predetermined point on the earth with slight temporary nutation or excursions away from this point occuring as a function of time due to orbital mechanics. In order to properly utilize communications signals originating in the satellite and transmitted to a ground station, it becomes necessary to track the satellite as it makes its excursions. Servo systems for controlling the attitude of an antenna are well known to those skilled in the art. Additionally, systems such as step-track scanners have been utilized to accomplish the task of pointing an antenna to a synchronous satellite; however, such apparatus has proved to be extremely costly and exhibits relatively slow reaction time to satellite movement.

SUMMARY OF THE INVENTION

Briefly, the subject invention is directed to improvement in electrical servo systems for pointing an antenna to a remote signal source and maintaining its attitude thereto for variations of movement of the signal source. The control system is digital in nature and operates on the principle of the approach towards zero slope of the antenna beam pattern near its peak. The system samples the input signal from the remote source at predetermined intervals, which input is transformed into a multi-bit digital signal sample which is fed into a holding register. Digital logic circuits compare successive digital samples and provide control signals to the antenna drive motors such that if the subsequent sample is greater than the previous sample, the logic circuitry determines that the antenna is moving in a proper direction and continues the application of the appropriate control signals; while if on the other hand the subsequent sample is less than the former, the logic determines that the antenna is moving in the wrong direction and accordingly applies control signals for reversing directions. When three consecutive samples indicate a predetermined digital value relationship between a predetermined number of significant bits which occurs near the peak of the antenna beam pattern, a stop command signal for the antenna is provided. The operating sequence is such that the control circuitry slews the antenna in a first axis, e.g. elevation, and then, when desirable, switches to slew the antenna in another axis, e.g. azimuth. Peaking is performed twice on the "first" or initial slew sequence for each axis; however, repeaking is initiated upon the termination of a selectable time interval or when the AGC reading falls below a selectable threshold for three consecutive samples.

DESCRIPTION OF THE PREFERRED EMBODIMENT

Figure 1:
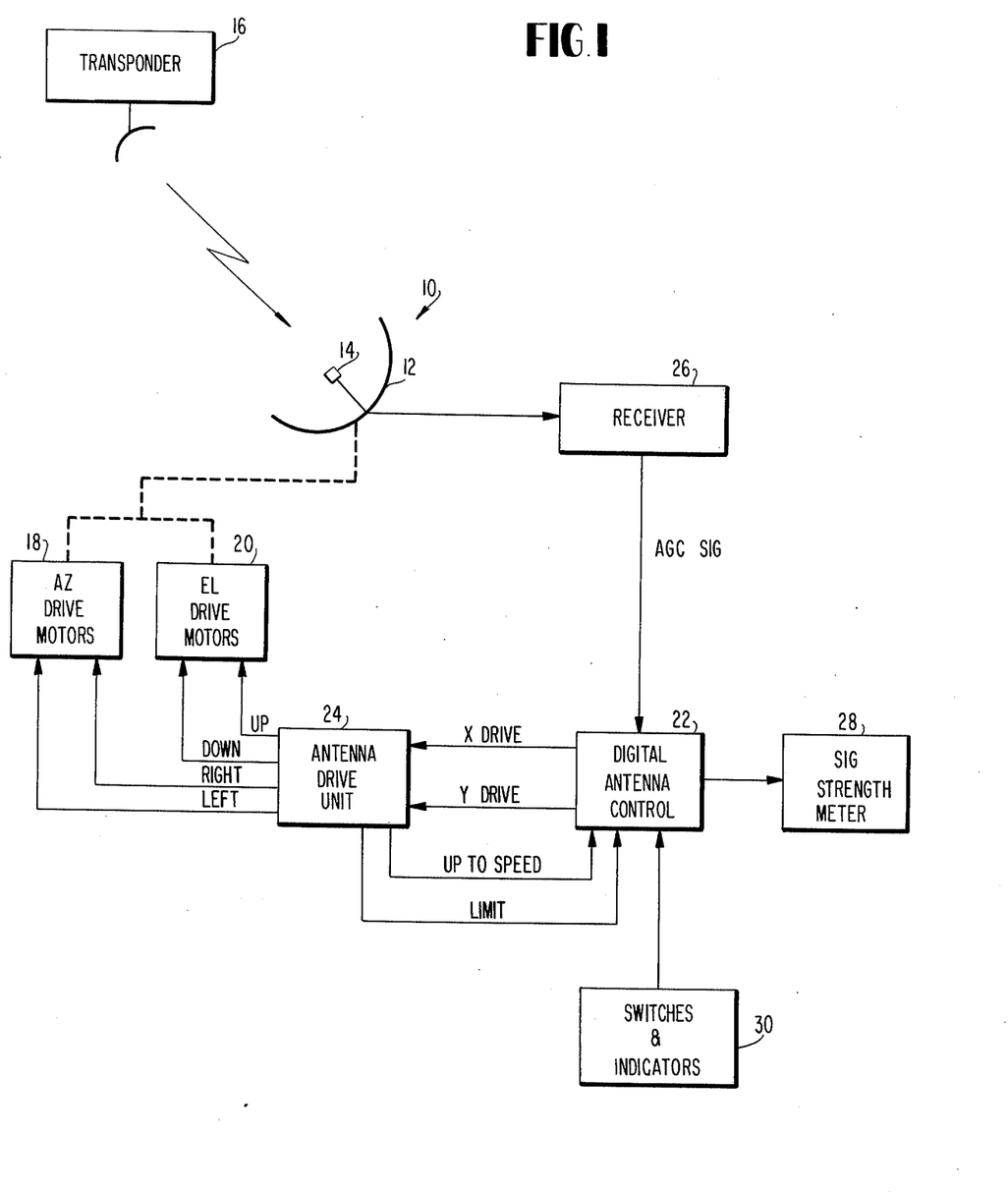
FIG. 1 is a block diagram illustrative of the subject invention.
Figure 3:
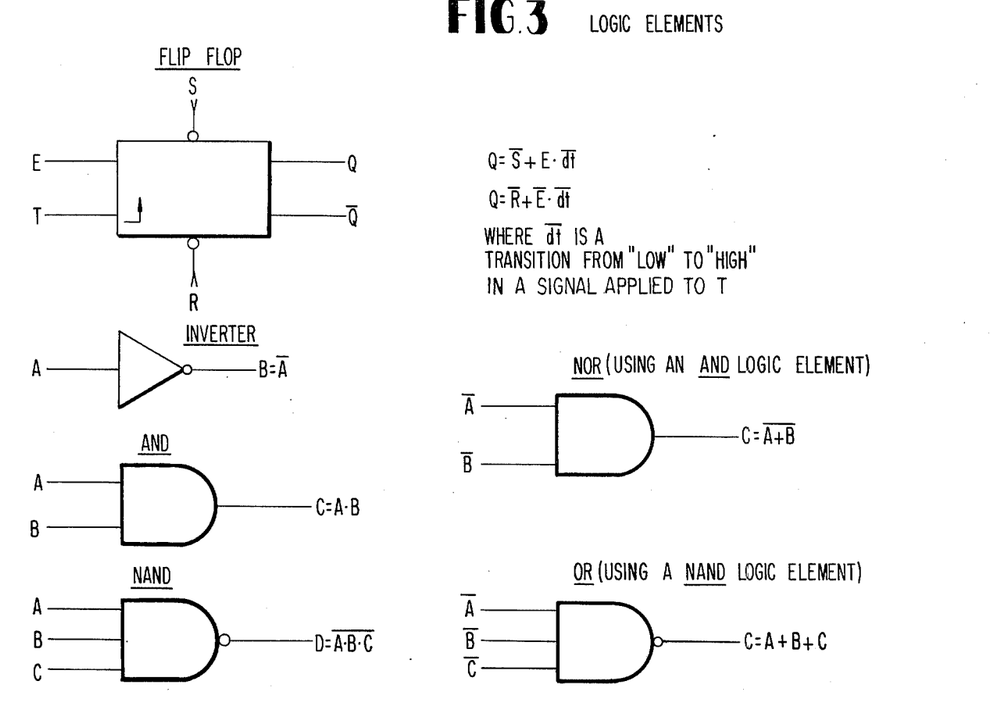
FIG. 3 is a diagram illustrative of the logic elements and their binary operation which are utilized by the subject invention.
Figure 4:
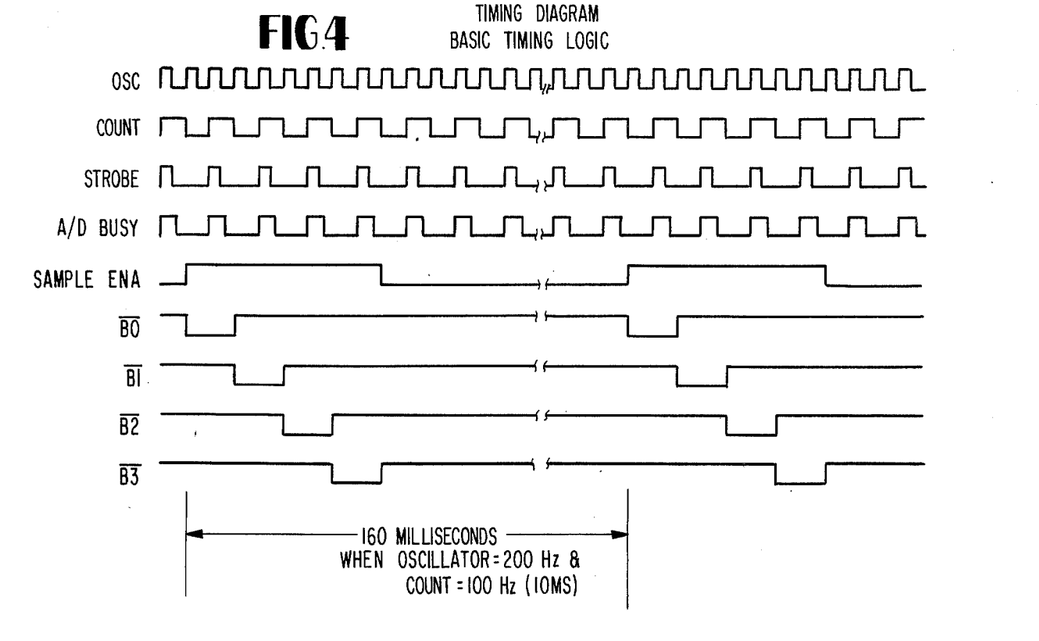
FIG. 4 is a diagram of time related waveforms helpful in understanding the operation of the subject invention.

Referring now to the drawings in view of logic elements shown in FIG. 3 and the waveforms shown in FIG. 4, reference is first made to FIG. 1 wherein reference numeral 10 generally designates a directional antenna comprised of a parabolic reflector 12 and a feedhorn 14. The antenna 12 is directed toward a remote transponder 16 e.g. a synchronous satellite and is adapted to be driven in the azimuth and elevational axes by means of electrical drive motors 18 and 20. The drive motors 18 and 20 receive right/left and up/down control signals in response to the operation of digital automatic control apparatus 22, which constitutes the heart of the subject invention, and antenna drive unit apparatus 24 which includes manual control means. The manual control of apparatus 24 is utilized to obtain course acquisition of the transponder 16, while the digital control apparatus 22 takes over thereafter to automatically provide fine acquisition. The antenna drive apparatus 24 is well known to those skilled in the art and is provided by the antenna manufacturer to slew the antenna 10 via manually operated spring loaded switches, not shown, and is adapted to override signals from the automatic control apparatus 22 so that course acquisition can manually be provided at any time. A communications receiver 26 is coupled to the feedhorn 14 of the antenna 10 and is responsive to the signal transmitted from the transponder 16 by including the necessary low noise amplifiers, mixers and detectors. An output signal is coupled from the receiver 26 to the digital control apparatus 22. The output signal therefrom comprises an AGC (automatic gain control) signal which is proportional to the received signal strength received at the antenna 10. Additionally, the block diagram in FIG. 1 also discloses a signal strength meter 28 and a block 30 indicative of selection switches and indicators which are utilized in connection with the operation of the digital antenna control apparatus 22.

Figure 2:
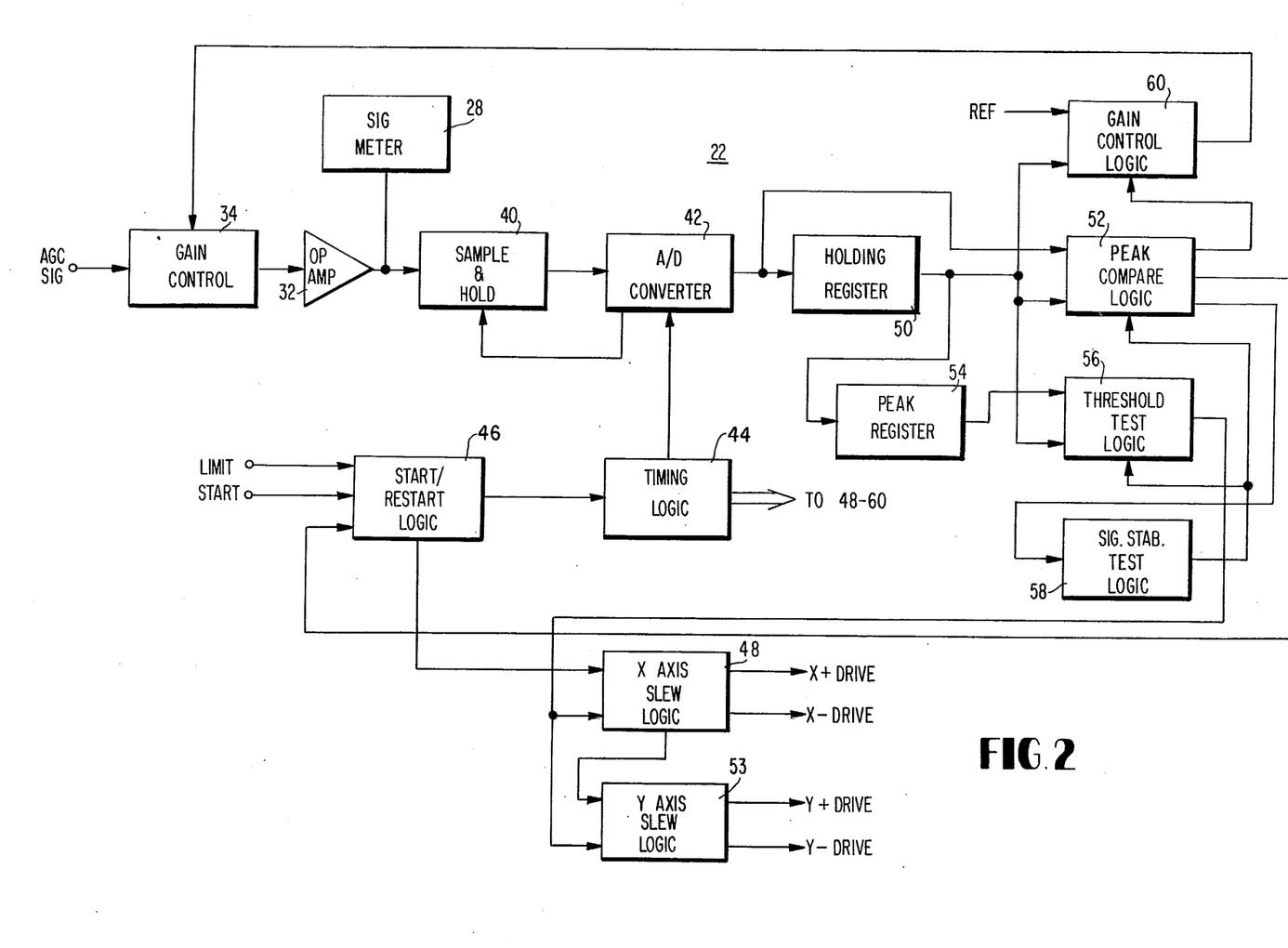
FIG. 2 is a block diagram illustrative of the preferred embodiment of the digital antenna control apparatus for controlling the orientation of the antenna shown in FIG. 1.

Referring now to FIG. 2, there is disclosed a block diagram of the digital antenna control apparatus 22 shown in FIG. 1. The input signal from the receiver 26 shown in FIG. 1 is coupled to the input of an adjustable operational amplifier 32 through a gain control circuit 34. The output of the operational amplifier 32 is converted into periodic digital samples by means of a sample and hold circuit 40 and an analog-to-digital converter 42 under the control of a timing logic circuit portion 44. A start/restart logic circuit portion 46 is coupled to the timing logic and is operable, inter alia, to provide a reset signal for the timing logic at the beginning of a slew sequence as well as initiating the slew logic circuitry for one axis, for example the X axis slew logic circuit 48 for moving the antenna in one initial axis.

The digital samples corresponding to the received signal strength sampled at periodic intervals are fed into a holding register 50. The holding register feeds into a peak compare logic circuit portion 52 which additionally receives the digital samples from the A/D converter 42. The antenna 10 meanwhile is being driven on one axis, e.g. elevation and each data sample is compared to the data sampled during the immediate preceding sampling period for equality or if an increasing signal is detected, the peak compare logic 52 is enabled to "look" for readings that are equal or begin to decrease following the increase. When three consecutive equal samples are sensed or three consecutive equal or decreasing samples following an increase are sensed, the peak compare logic section 52 indicates that optimum pointing has been achieved on the X or elevation axis and the sequence is repeated for the other axis by enabling a Y axis slew logic portion 53. Any other deviation from this operation will cause the peak compare logic portion 52 to provide a reverse command signal to either the X axis or Y axis slew logic portion 48 or 53 whereupon the respective antenna drive motor will cause the antenna to move in the opposite direction along the respective axis.

As noted, once optimum pointing has been achieved on the initial axis, the peak compare logic circuitry 52 will cause the sequence to be repeated for the other axis. The slewing sequence, however, must initially be started by an operator and accordingly the start/restart logic portion 46 will cause the pointing sequence for each axis to be repeated a second time to guarantee that the optimum signal has been achieved. When the slewing sequence for both axes has been completed, the content of the holding register 50 is fed into a peak register 54 and is indicative of the signal strength reading received at the time the maximum or peak is achieved. The timing logic circuitry 44 includes timing means which will count down for a predetermined time period which upon the expiration thereof the start/restart logic 46 will cause the slew sequence to be repeated once again on each axis until a new peak is obtained. While the timer means in the timing logic 44 is counting, a second or threshold compare logic circuit portion 56 is coupled both to the holding register 50 and the peak register 54 and is adapted to compare the content of the holding register against the content of the peak register, which if there is a predetermined departure for two comparisons in a selected time interval, will provide a threshold error signal output which will in the event of a third threshold error signal, cause a new slew sequence to be initiated by the start/restart logic provided the digital antenna control apparatus has not been purposely disabled by the operator.

Figures 7, 8:
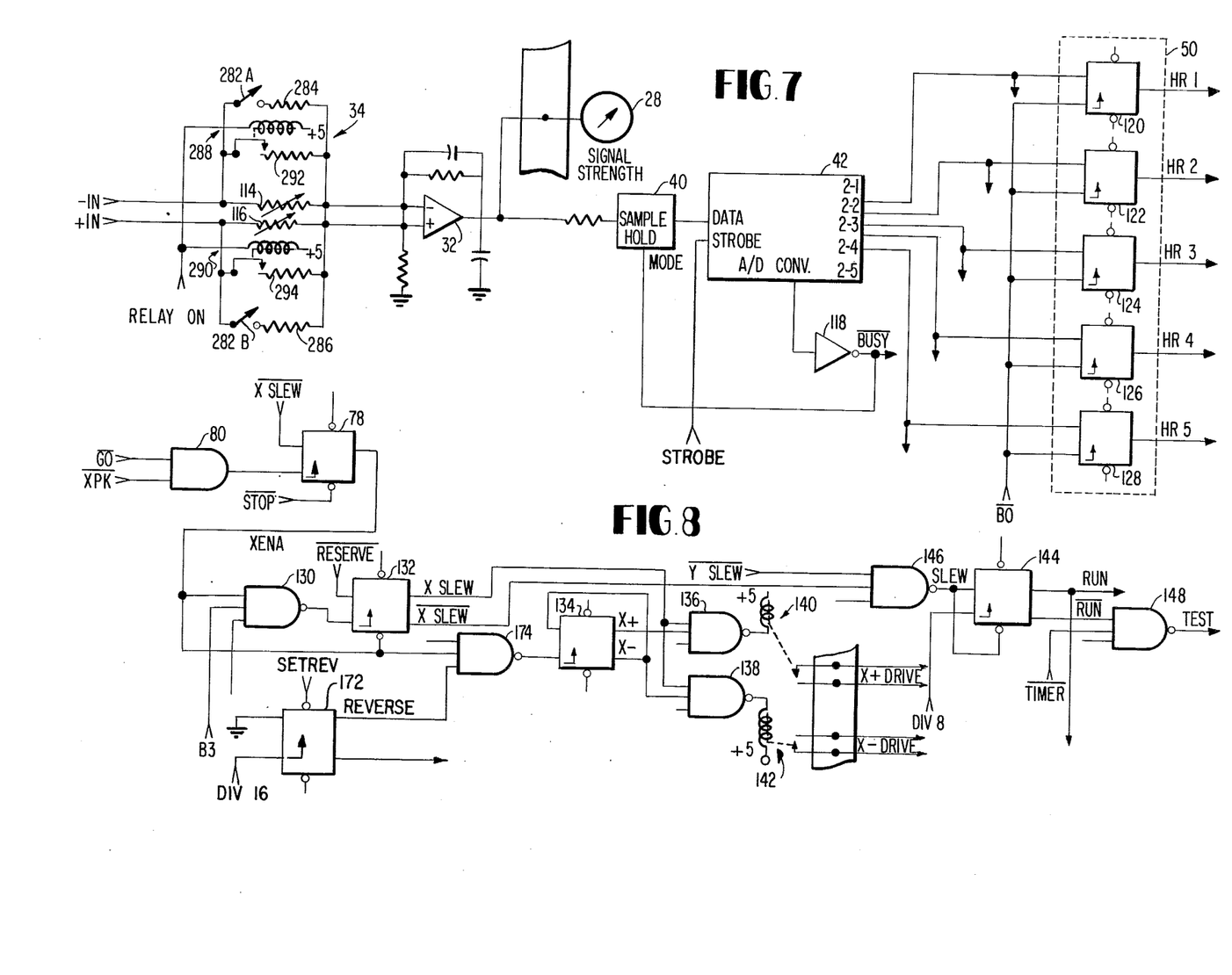
FIG. 7 is a logic schematic diagram further illustrative of the operational amplifier, sample and hold circuit, analog to digital converter, and holding register portions of the digital antenna controller apparatus shown in FIG. 2.
FIG. 8 is a logic schematic diagram further illustrative of the X axis control and slew logic portion of the digital antenna controller apparatus shown in FIG. 2.

Additionally, if samples at predetermined sub-intervals within a sampling period are not nearly equal as determined by a signal stability test logic portion 58 coupled to the timing logic circuitry 44 and the peak compare logic circuitry 52, the peak compare logic is disabled for that sampling period. The gain control circuitry 34 coupled to the operational amplifier 32 in addition to being manually adjustable, is controlled by means of a gain control logic circuit portion 60 which is adapted to compare the content of the holding register 50 against a predetermined fixed reference signal level value. Manual adjustment is provided so that during installation, such variables as station location, receiver type, etc. can be taken into account. Also a manual switch, shown in FIG. 7, is available to add gain during periods of bad weather, etc. The gain control logic section 60 provides an automatic gain increase when the signal received by the antenna 10 is below a predetermined level when the slew sequence is complete. Additionally, if the increase in gain does not result in a predetermined signal level, an indication, such as an audible alarm, is provided to alert the operator to select a higher gain by using the manual switch shown in FIG. 7 or to use the antenna drive 24 to reposition the antenna manually to provide a new course acquisition.

Figure 5:
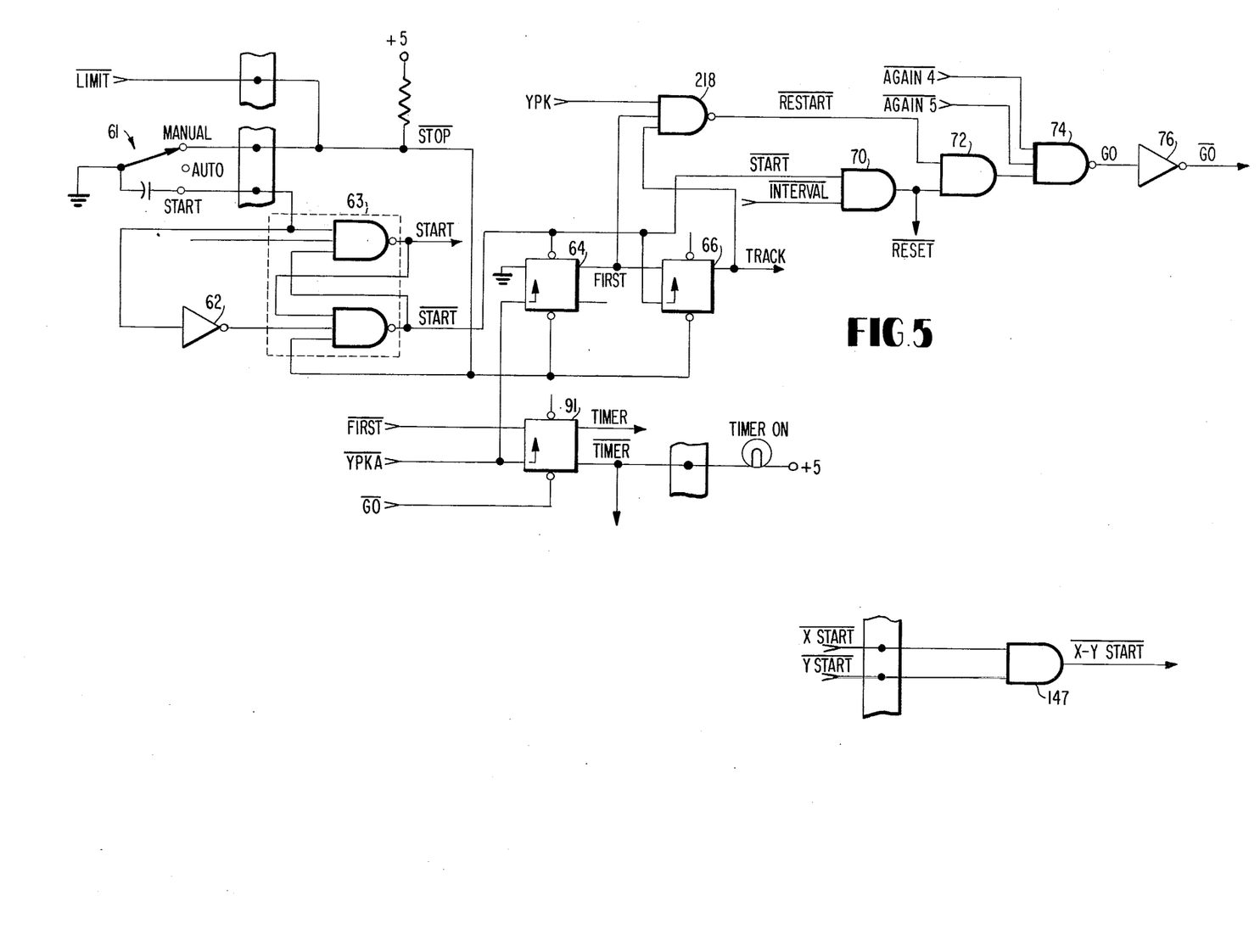
FIG. 5 is a logic schematic diagram further illustrative of the start/restart logic portion of the digital antenna controller apparatus shown in FIG. 2.

Considering now the invention in greater detail, wherein a binary signal convention e.g. signal A and its complementary signal $\overline{A}$ is used throughout, reference is now made to FIG. 5, which is illustrative of the start/restart logic circuit portion 46. Switch 61 when in the MANUAL position, places the system in a STANDBY state such that the antenna 10 shown in FIG. 1 may only be driven manually by the antenna drive unit 24. This switch position effectively places an open circuit across the START contact, which applies a binary "high" state on the input of a logic inverter 62 and accordingly a binary "low" state at the output thereof. The MANUAL position of the switch 61 provides a $\overline{STOP}$ signal which signal in addition to the binary low signal at the output of logic invertor 62 is used to reset a flip-flop 63 comprised of a pair of cross coupled NAND gates providing complementary START and $\overline{START}$ outputs. The $\overline{STOP}$ signal also resets a "first" flip-flop 64 and a "track" flip-flop 66 which provides FIRST and TRACK signals respectively. The TRACK signal is coupled to predetermined logic elements to inhibit operation of the digital antenna control circuitry, the most important being the disabling of a "count" flip-flop 68 and a "sample enable" flip-flop 69 contained in the timing logic circuitry shown in FIG. 6.

Figure 6:
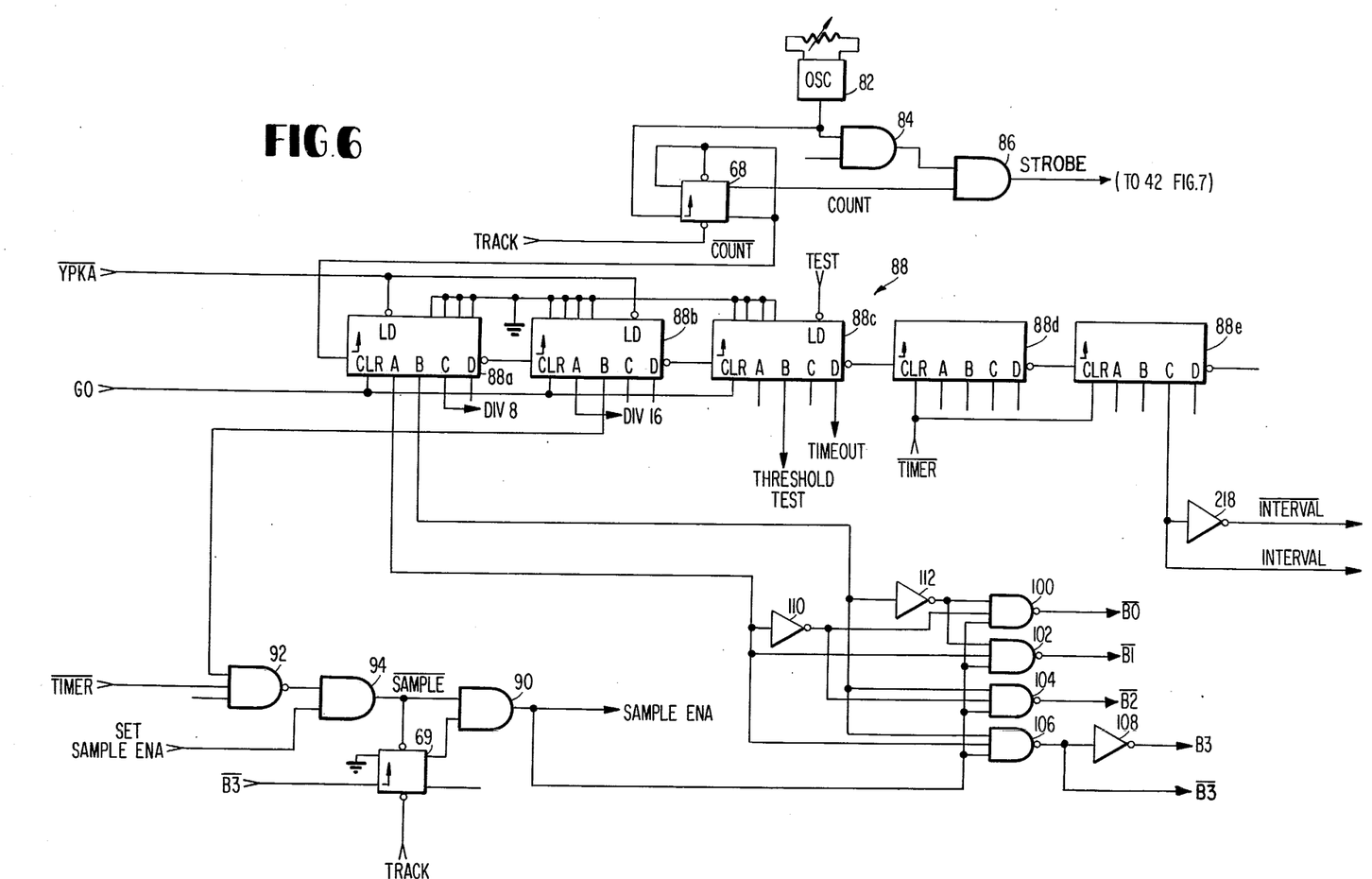
FIG. 6 is a logic schematic diagram further illustrative of the timing logic portion of the digital antenna controller apparatus shown in FIG. 2.

With these two flip-flops inhibited, the timing logic circuitry and thus the automatic mode is disabled.

Switch 61 shown in FIG. 5 when placed in a momentary START position, sets the "start"flip-flop 63 which sets the first flip-flop 64. Release of the switch 61 resets the start flip-flop 63 and sets the track flip-flop 66, which then set allows the various logic elements shown primarily in FIG. 6 to operate by releasing the forced reset applied thereby. A $\overline{START}$ output signal from the start flip-flop 63 is also coupled to a logic gate 70 to produce the following signals: A $\overline{RESET}$ signal at the output of gate 70; a GO signal at the output of logic gate 74 and a $\overline{GO}$ signal at the output of a logic inverter circuit 76. The trailing edge of the $\overline{GO}$ signal sets the "X enable"flip-flop 78 shown in the X axis slew logic circuitry shown in FIG. 8. This is accomplished by means of the logic gate 80 also shown in FIG. 8 receiving a $\overline{GO}$ signal and an $\overline{XPK}$ signal. Meanwhile, the count flip-flop 68 (FIG. 6) which is coupled to a master clock oscillator 82, divides the output frequency of the oscillator 82 in half (÷2) thereby providing a clock signal identified as the COUNT signal which for the sake of illustration is noted to be 100Hz (FIG. 4). The output of the oscillator 82 is also applied to a logic gate 84 which is coupled to a logic gate 86, also receiving the COUNT signal for providing a STROBE signal to the analog-to-digital convertor 42 shown in FIG. 7 in the middle of a count period for updating the analog-to-digital convertor. The complementary output of the count flip-flop 68 comprises a $\overline{COUNT}$ signal which is applied to a 20 bit binary down-counter 88 comprised of five binary counters 88a, 88b, 88c, 88d, and 88e. Five timing signals $\overline{BO}$, $\overline{B1}$, $\overline{B2}$, $\overline{B3}$ and B3 are generated in the timing logic circuitry shown in FIG. 6 and comprise timing pulses which define four sub-intervals used in the system for decision and control. These signals are successive 10 millisecond pulse signals generated by decoding the output from terminals A and B of counter 88a and being gated with the SAMPLE ENA signal to logic gate 94. The $\overline{BO}$ signal appears to the output of logic gate 100, while the signals $\overline{B1}$, $\overline{B2}$ and $\overline{B3}$ appear to the output of logic gates 102, 104 and 106. The B3 signal appears at the output of logic inverter 108, which is coupled to the logic gate 106. Additionally, logic inverters 110 and 112 are respectively coupled from the A and B terminals of counter 88a to provide the necessary signal combination.

The least significant bits of the downcounter 88 are reset by the GO signal applied to the clear input of counters 88a, 88b and 88c from logic gate 74 (FIG. 5) in order that the down-counter will start with a clear counter at the start of each slew sequence. The $\overline{BO}$ signal becomes a pulse coincident with the zero count occurring at a frequency 1/16 of the repetition rate of the count signal which for example would occur every 160 milliseconds for a COUNT signal frequency of 100Hz. This time is selectable and becomes different if a master oscillator frequency of other than 200Hz is selected. Similarly, $\overline{B1}$, $\overline{B2}$ and $\overline{B3}$ are pulses occurring at three consecutive time intervals of 10 milliseconds each.

Referring now to FIG. 7, the operational amplifier 32 and gain control circuit 34 provide the appropriate gain to the received analog input signal from the antenna 10 which is then applied to the sample and hold circuit 40 to place it in an operating range that will approach a predetermined voltage, for example, 10 volts maximum at the peak received signal. This gain is initially set by manual adjustment of variable resistors 114 and 116. The output of the operational amplifier is fed to the input of the sample and hold circuit 40 as well as to a signal strength monitor which may be, for example, a voltmeter 28. When a STROBE signal is applied from the timing logic gate 86 (FIG. 6) every 10 milliseconds, the analog-to-digital (A/D) converter 42 goes "busy" and a new conversion of the analog sample begins. A BUSY signal is inverted in the inverter 118 and a $\overline{BUSY}$ signal is coupled to the "mode" input of the sample and hold circuit 40 to immediately hold the analog voltage that had been averaged over the immediate past 10 milliseconds. Conversion is completed well before the next positive transition of the $\overline{BO}$ pulse. Following the A/D conversion, the trailing edge of the $\overline{BO}$ pulse next sets the five output bits $2^{-1}$, $2^{-2}$, $2^{-3}$, $2^{-4}$ and $2^{-5}$ of the A/D converter 42 into the peak holding register 50 which is comprised of five flip-flops 120, 122, 124, 126 and 128 with the output HR1 from the flip-flop 120 being the most significant bit. The remaining output bits constitute the signals HR2, HR3, HR4 and HR5 respectively from the flip-flops 122, 124, 126 and 128.

Referring now to FIG. 8, which is further illustrative of the X axis slew logic circuitry, the first B3 signal from the output of the inverter 108 shown in FIG. 6 that occurs is gated together with an XENA signal from the X enable flip-flop 78 by means of logic gate 130 to set a "X slew" flip-flop 132 on the trailing edge of the B3 timing signal providing complementary output signals defined as X SLEW and $\overline{X\ SLEW}$. The X slew flip-flop 132 is then gated with the output of a X axis directional flip-flop 134 in the gates 136 and 138 for controlling X axis directional drive relays 140 and 142. The selected relay closure is coupled to X+or X−drive units contained in the antenna drive unit 24 shown in FIG. 1 which will start a motor drive, for example the elevation drive motor 20, in one direction. The $\overline{X\ SLEW}$ signal from flip-flop 132 is coupled to a "run" flip-flop 144, by means of the logic gate 146 to set flip-flop 144 on a divide by eight count (DIV 8) signal from the C terminal of counter 88a for providing a delay which permits the antenna 10 time to get up to speed.Alternatively, the X-YSTART signal generated in logic gate 147 of FIG. 5 may be used when necessary in place of divide by eight to set the run flip-flop 144. As soon as the run flip-flop 144 is set, the logic gate 148 goes high providing a TEST output signal, which signal is adapted to enable the signal stability test logic circuitry 58 shown in FIG. 11 and which will be discussed subsequently.

Figure 9:
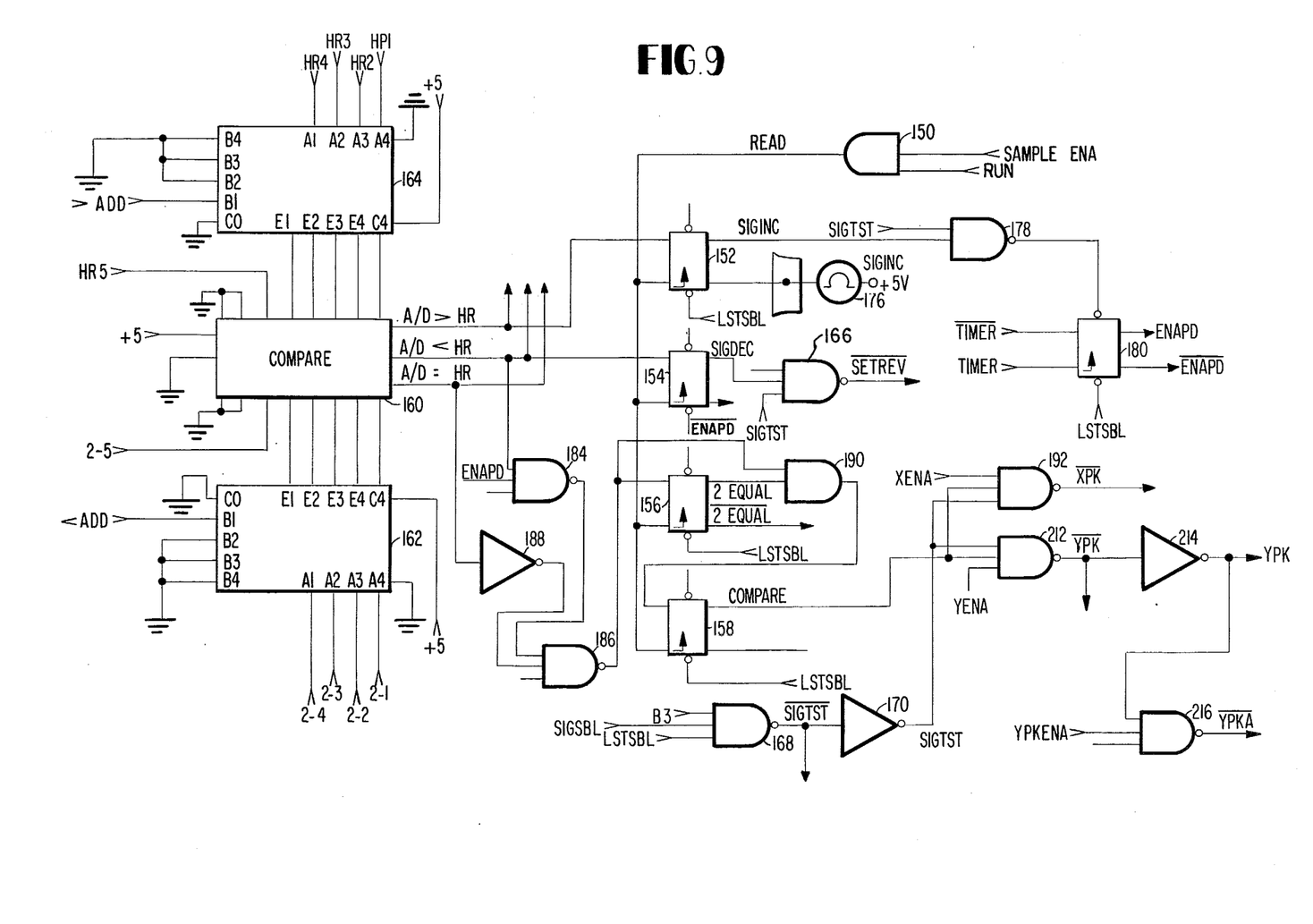
FIG. 9 is a logic schematic diagram further illustrative of the peak compare logic portion of the digital antenna controller apparatus shown in FIG. 2.
Figures 10, 11:
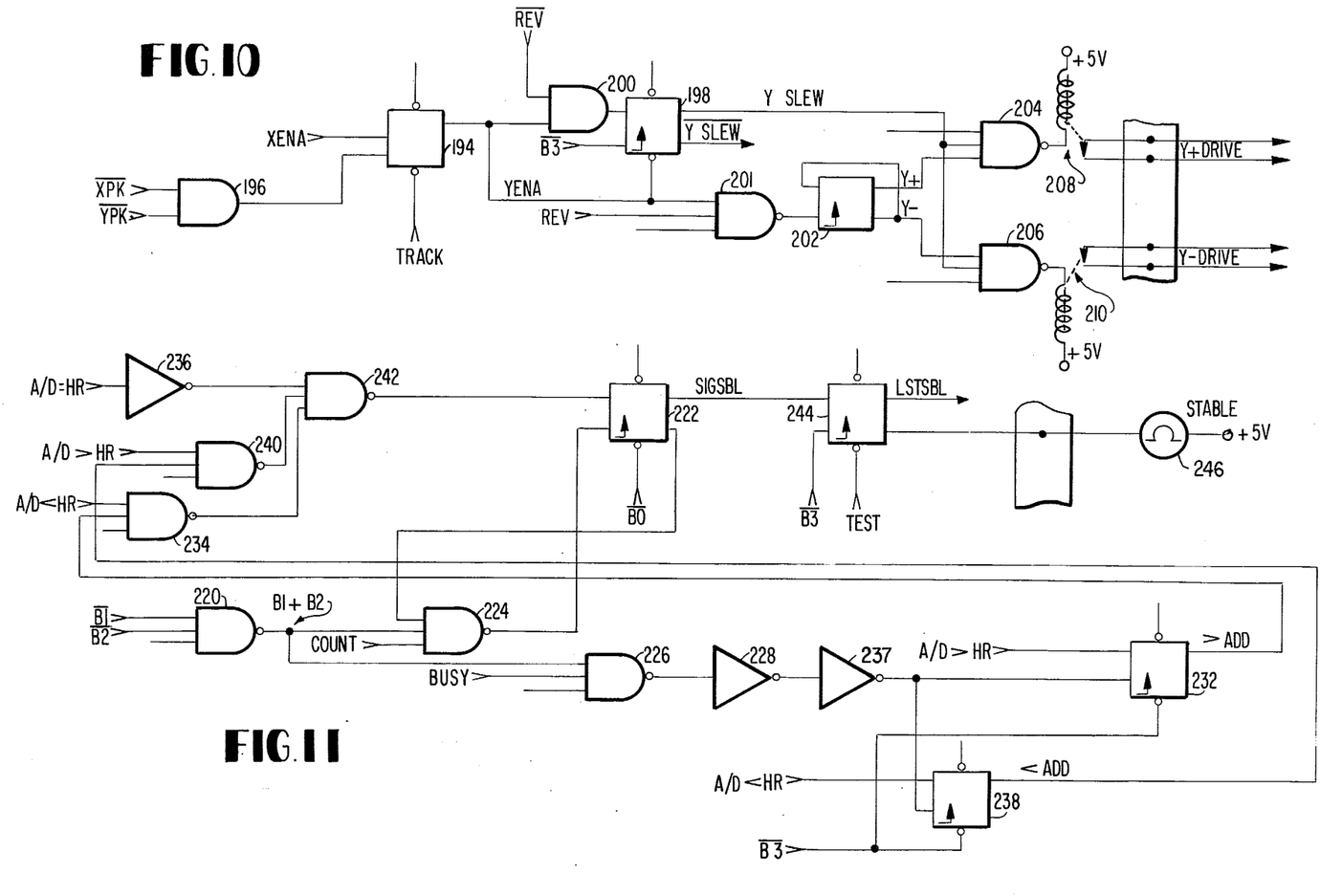
FIG. 10 is a logic schematic diagram further illustrative of the Y axis control and slew logic portion of the digital antenna controller apparatus shown in FIG. 2.
FIG. 11 is a logic schematic diagram further illustrative of the digital stability test logic portion of the digital antenna controller apparatus shown in FIG. 2.

The setting of the run flip-flop 144 also enables logic gate 150 located in the peak compare logic circuitry 52 shown in FIG. 9 at which time a READ output signal occurs when the following SAMPLE ENA signal arrives from logic gate 90 shown in FIG. 6. Referring now to FIG. 9, the trailing edge of the READ pulse is applied to flip-flops 152, 154, 156 and 158 and occurs just prior to the leading edge of a $\overline{BO}$ signal. A digital comparator circuit 160 coupled to the adders 162 and 164 is adapted to provide one of three signal outputs A/D>HR, A/D<HR, or A/D = HR to the flip-flops 152 . . . 158 in response to a comparison between the present digital signal sample in the A/D converter 42 by having the output bits $2^{-1}$, $2^{-2}$, $2^{-3}$ and $2^{-4}$ coupled to the input of an adder 162 and the previous digital sample of the holding register 50 that was stored from the A/D converter output on the trailing edge of the previous $\overline{BO}$ signal and is applied to adder 164. Additionally, a signal ">add" when generated in FIG. 11 is applied to one input of the adder 164 while a "<add" signal is applied to adder 162. These signals are zero at all times except during signal stability test times which occur during the $\overline{B1}$ and $\overline{B2}$ sub-intervals. Thus during the READ signal that occurs just prior to $\overline{BO}$ the adders 162 and 164 are adding zero to the basic four bits of the holding register and analog-to-digital inputs to adders 164 and 162, respectively. The comparator 160 is adapted to accept these basic four bits applied from the holding register 50 and A/D converter 42 as well as a fifth bit from each for finer resolution.

If the comparator output is A/D>HR, "signal increase" flip-flop 152 is set thus providing a SIG INC signal, indicating a signal increase; while if the output comprises a A/D<HR signal, "signal decrease" flip-flop 154 is set thus providing an output of SIG DEC, indicating a signal decrease. An increase in signal strength means the antenna 10 is moving in the proper direction and no reversal is required. If, however, a decrease is detected i.e. a SIG DEC is present, logic gate 166 coupled to the signal decrease flip-flop 154 generates a $\overline{SET\text{-}REV}$ signal. A SIG TST signal is also coupled to gate 166 and is provided by logic gate 168 and inverter 170. The SIG TST signal is a B3 timing pulse created only when signals determining the present sample (SIGSBL) and last sample (LSTSBL) of the data is stable as determined by the signal stability test logic circuitry shown in FIG. 11. The $\overline{SETREV}$ signal from the logic gate 166 sets a "reverse" flip-flop 172 shown in FIG. 8 which provides a REVERSE signal output which resets the X slew flip-flop 132 on the trailing edge of the B3 timing pulse and operates the direction flip-flop 134 on the reverse trailing edge by means of logic gate 174 which receives a X ENA signal in addition to the REVERSE signal. The "reverse" flip-flop 172 is reset by a divide by 16 (DIV 16) signal appearing at terminal A of counter 88b of the downcounter 88 shown in FIG. 6. This allows the antenna time to stop prior to reversal. Logic gates 136 and 138 then provide the proper operation of relays 140 and 142 to drive the elevation drive motor 20 shown in FIG. 1 in the opposite direction.

The output of the comparator 160 shown in FIG. 9 should now indicate either a signal increase (A/D>HR) or an equal (A/D=HR) output. If there is an increase, "signal increase" flip-flop 152 is set and a lamp 176 is illuminated. A logic gate 178 coupled to flip-flop 152 provides a signal that will set flip-flop 180. Flip-flop 180 provides a ENAPD signal and its complement. It can also be set if a SIG INC signal is not sensed within a specified time period determined by a TIME OUT signal from terminal D of counter 88c and the TIMER signal from flip-flop 91 in the start restart logic shown in FIG. 5 enables flip-flop 180 with a high input. Once flip-flop 180 is set, the signal decrease flip-flop 154 cannot be set due to the $\overline{ENAPD}$ signal coupled thereto. Therefore, no further reversals can occur until the next axis is selected. If a signal decrease next occurs, a logic gate 184 provides a low binary state to a gate 186 which enables the "2 equal" flip-flop 156 to be set on the next READ signal. Flip-flop 156 can also be enabled by an A/D=HR output from the comparator 160 by means of the inverter 188 and gate 186 at any time. This means then that the flip-flop 156 which is indicative of the two equal signal samples, provides a 2 EQUAL and $\overline{2\text{ EQUAL}}$ signal output and can be set only if A/D=HR at any time a READ is applied from logic gate 150 or A/D<HR is sensed at a time a READ is applied and a previous increase has occurred. This technique is used since it means that in either case the antenna is slewed to the maximum signal along that axis.

Next the output of logic gate 186 and 2 equal flip-flop 156 is gated out of the logic gate 190 so that when another A/D = HR output or A/D<HR and a ENAPD occurs, the "compare" flip-flop 158 will be set providing a COMPARE output. The compare flip-flop 158 is then set on the following READ signal, and if the signals are stable, a $\overline{XPK}$ signal is provided at the output of gate 192. The X enable flip-flop 78 shown in FIG. 8 is reset by means of the signal $\overline{XPK}$ applied to logic gate 80 and thus antenna drive signals are no longer provided and accordingly the antenna drive is removed.

Next the other or Y axis, which for example comprises the azimuth axis, is slewed. Referring now to FIG. 10, a "Y enable" flip-flop 194 is set by the $\overline{XPK}$ signal applied to logic gate 196 on the following $\overline{B3}$ signal from the timing logic circuitry shown in FIG. 6. When flip-flop 194 sets, the "Y slew" flip-flop 198 is set through the logic gate 200. The Y SLEW output signal from flip-flop 198 is gated with the output of a Y axis directional flip-flop 202 and drive signals for the Y axis is provided in the appropriate direction by logic gates 204 and 206 respectively, operating relays 208 and 210 coupled to circuitry in the antenna drive unit 24 for providing appropriate drive signals to the azimuth drive motor 18 shown in FIG. 1. The Y or azimuth axis is thus activated and the binary logic operations previously described with respect to the X or elevation axis is repeated. If the reverse flip-flop 172 shown in FIG. 8 is again set, the Y slew flip-flop 198 is reset and direction control is effected as required. When a COMPARE output signal again occurs at the output of flip-flop 158 shown in FIG. 9, the $\overline{YPK}$ signal is provided at the output of logic gate 212 (FIG. 9) which resets the Y enable flip-flop 194 by means of logic gate 196. Also, a YPK signal is provided by means of the inverter 214 shown in FIG. 9. Additionally, a $\overline{YPKA}$ signal will occur at the output of logic gate 216 (FIG. 9) if a YPKENA signal is present. The latter signal is provided by the gain control logic circuitry shown in FIG. 13 and which will be discussed subsequently.

Assume for the present that the $\overline{YPKA}$ signal has occurred. The $\overline{YPKA}$ signal resets the first flip-flop 64 shown in FIG. 5. Referring now back to FIG. 5, a $\overline{RESTART}$ signal is generated at the output of gate 218 (FIG. 5). The $\overline{RESTART}$ signal is coupled to the logic gate 72 of FIG. 5 to provide a GO signal at the output of logic gate 74 and a $\overline{GO}$ signal at the output of gate 76. This causes the down-counter 88 (FIG. 6) to clear and the entire sequence is repeated as described above until another $\overline{YPKA}$ signal occurs. This second $\overline{YPKA}$ signal then sets the "timer" flip-flop 91 shown in FIG. 5 and the peaking sequence is completed for both axes but will be repeated again if a "threshold error" occurs or when an INTERVAL signal occurs at terminal C of counter 88e at some time later. Additionally, an $\overline{IN\text{-}TERVAL}$ signal appears at the output of inverter 218.

Referring now to FIG. 11, signal stability determination is an important part of the subject invention since an invalid digital sample from the A/D converter 42 (FIG. 7) must not be used for comparison. Signal stability, however, need not be exact, but each reading or sample occurring at the $\overline{BO}$ time period is re-compared to the value of the signal held in the sample and hold circuit 40 at sub-interval times $\overline{B1}$ or $\overline{B2}$ to test for a margin of error as specified by a predetermined factor fed into the adders 162 and 164 shown in FIG. 5. The timing pulses $\overline{B1}$ and $\overline{B2}$ following $\overline{BO}$ are fed to logic gate 220 in FIG. 11 whose output becomes B1 + B2. This signal is gated with the COUNT signal from the count flip-flop 68 shown in FIG. 6 and the $\overline{SIGSBL}$ signal from the flip-flop 222 by gate 224. A BUSY signal from the A/D converter 90 is gated with B1 + B2 by gate 226 in the middle of the count. The output of logic gate 226 is fed to inverters 228 and 236 which introduces delays to allow for operational delays inherent in the comparator 160 and the adders 162 and 164 shown in FIG. 9. If the A/D>HR output is present at the output of the comparator 160 at mid count, the flip-flop 232 is set and a >ADD signal is applied to the adder 164 which will add a value to the holding register input HR1 ... HR4 resulting in a A/D<HR signal being applied to the logic gate 234 or an A/D = HR signal at the input of inverter 236. Similarly, if the mid-count output of the comparator 160 indicates an A/D<HR, flip-flop 238 would be set and a <ADD signal would be generated and a value would be added to the A/D input $2^{-1}$ ... $2^{-4}$ of the adder 162 such that the result should be an A/D>HR signal which is applied to logic gate 240. The outputs of logic elements 234, 236 and 240 are ORed at gate 242 to provide an enable signal for the "signal stable" flip-flop 222 if the signal sampled at the time $\overline{BO}$ is nearly equal or equal to the reading at either $\overline{B1}$ or $\overline{B2}$.

Note that an equal condition at mid-count sets neither flip-flop 232 nor flip-flop 238 and therefore the A/D = HR output will be retained at the comparator 160 (FIG. 9). The trailing edge of the $\overline{B1} + \overline{B2}$ and COUNT signals then will set flip-flop 222 if the output of gate 242 is high. The leading edge of the $\overline{B3}$ timing signal resets flip-flops 232 and 238 while the trailing edge of the $\overline{B3}$ signal then sets the flip-flop 244 which generates the LSTSBL signal so that when comparisons are made in the peak compare logic circuitry (FIG. 9) the digital value in the holding register 50 is known to be valid due to the setting of flip-flop 244. Likewise, the digital value in the A/D converter 42 is known to be valid because of the setting of flip-flop 222 which provides the output signal SIGSBL and its complement $\overline{SIGSBL}$. An indication of signal stability is further provided by the indicator lamp 246 which is illuminated by the setting of flip-flop 244. The flip-flop 222 will be reset on the leading edge of each succeeding $\overline{BO}$ pulse so that each stability test made at the times $\overline{B1}$ and $\overline{B2}$ of any sampling interval begins with a clear SIGSBL signal. Also, the LSTSBL output of flip-flop 244 comprises the reset signal for a signal increase flip-flop 152 shown in FIG. 9, as well as the 2 equal flip-flop 156, the compare flip-flop 158 and the "ENAPD" flip-flop 180 to insure that these flip-flops are not allowed to become operative unless the sample is stable.

Figure 12:
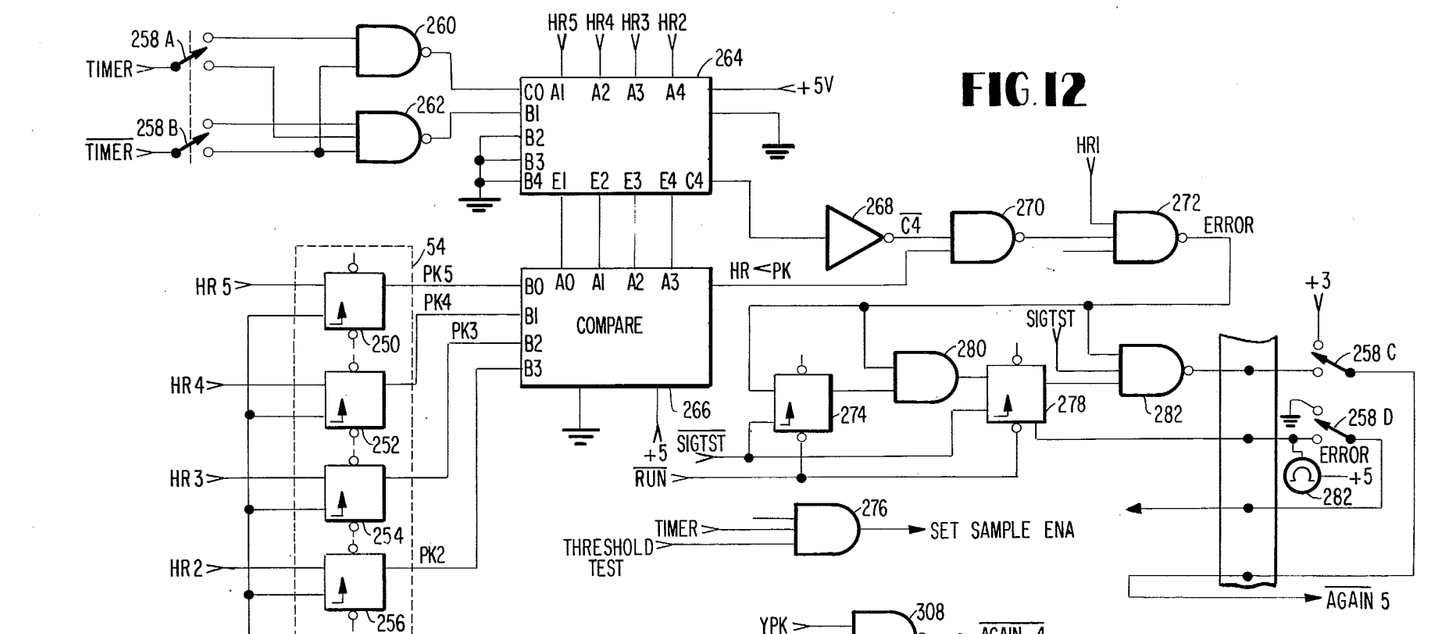
FIG. 12 is a logic schematic diagram further illustrative of the threshold test logic portion of the digital antenna controller apparatus shown in FIG. 2.

Referring now to FIG. 12 which discloses a logic schematic diagram further illustrative of the threshold test logic of the digital antenna controller, this circuitry as noted above is provided to insure that a new slew sequence will be initiated if the readings of the samples taken, while the downcounter 88 is operating, falls below the reading at the previous peak signal time $\overline{YPKA}$ within a selectable tolerance or if the reading is below a predetermined signal level such as below five volts ($5^v$). A peak register 54 comprised of four flip-flops 250, 252, 254 and 256 receive inputs of the signals HR2, HR3, HR4 and HR5 respectively, from the holding register 48 shown in FIG. 6 and is adapted to provide the output bit signals PK5, PK4, PK3 and PK2 which are loaded by the $\overline{YPKA}$ enabling signal from logic gate 216 shown in FIG. 9, which signal occurs at the peak of the input signal after slewing of the Y axis to the transponder. Two sections 258A and 258B of a four section switch 258 are respectively coupled to the TIMER and $\overline{TIMER}$ outputs of the timer flip-flop 91 shown in FIG. 5. Both switch sections are respectively coupled to gates 260 and 262 wherein the switch setting is adapted to establish a desired course or fine tolerance. The outputs of gates 260 and 262 are fed to an adder 264 where the tolerance required is added to the inputs HR2 ... HR5 applied from the holding register 50 shown in FIG. 7. The adder 264 output is coupled to a threshold comparator 266 where it is compared to the bits PK2 ... PK5. If the adder 264 has a "carry" output signal at terminal C4, it is inverted in the inverter circuit 268 and applied to logic gates 270 and 272 to generate a threshold ERROR signal. If no carry signal occurs, then an ERROR signal can be generated by a comparator output signal HR<PK of the comparator 266 which is also applied to logic gate 270, or if the HR1 bit from the holding register 50 is zero, meaning that the sample is less than five volts. The ERROR signal at the output of logic gate 272 is coupled to flip-flop 274 such that on the next or following $\overline{SIGTST}$ flip-flop 274 will be set. B3 timing pulses occur every 10 seconds due to the operation of logic gate 276 which provides a SET SAMPLE ENA signal in response to TIMER and THRESHOLD TEST inputs applied thereto. The THRESHOLD TEST SIGNAL is applied from Terminal B of counter 88c shown in FIG. 6 and will occur approximately every 10 seconds. The SET SAMPLE ENA signal from the gate 276 is fed to the sample gate 94 shown in FIG. 6. If another ERROR signal occurs on the next $\overline{SIGTST}$ signal, flip-flop 278 is set via the logic gate 280. This second threshold error causes the error lamp 282 to be illuminated. If a third threshold error occurs, logic gate 282 provides a signal to switch section 258C which, if closed, will provide an $\overline{AGAIN \, 5}$ signal to the input of the "go" gate 74 shown in FIG. 5 which generates a GO signal at the output thereof and wherein a GO signal appears at the output of inverter 76 at which occurrence a slew sequence again will be initiated.

Figure 13:
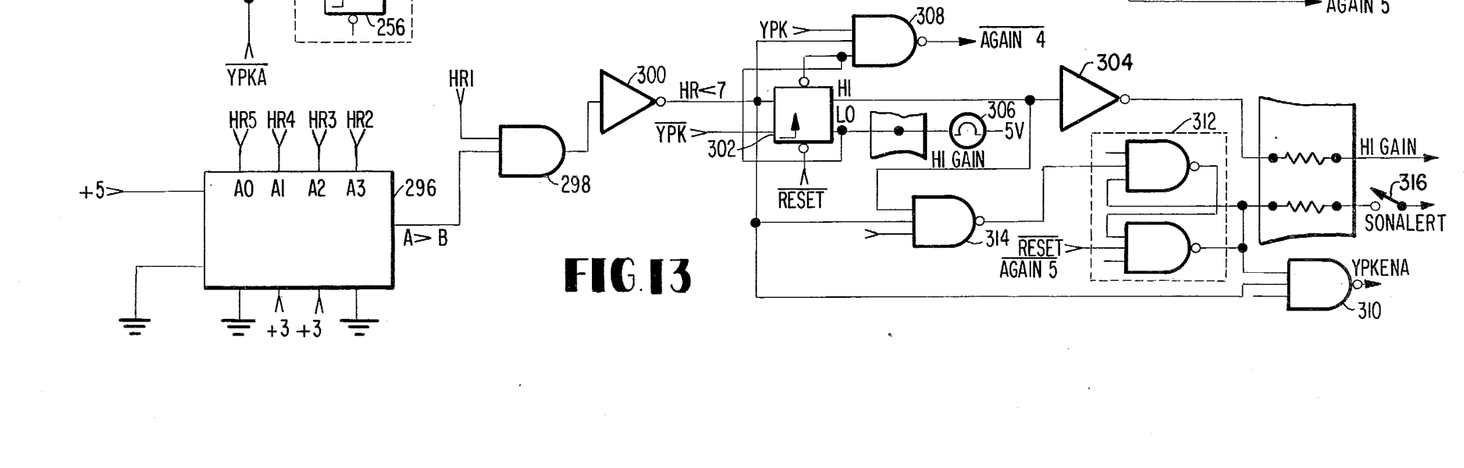
FIG. 13 is a logic schematic diagram further illustrative of the gain control logic portion of the digital antenna controller apparatus shown in FIG. 2.

Considering now the control of the gain of the operational amplifier 32 shown in FIG. 7, it can be manually selected by the operator when the two section switch 282A and 282B are closed which places respective fixed resistors 284 and 286 in parallel with the variable resistors 114 and 116 causing an increase in gain. Referring now to FIG. 13, there is additionally disclosed an automatic gain control circuit whereby a high gain setting can be provided by means of the control of the operation of relays 288 and 290 shown in FIG. 7. When energized, fixed resistors 292 and 294 are placed in parallel with the respective variable resistances 114 and 116. The relays 288 and 290 are operated on the reception of a HIGH GAIN signal applied thereto from the circuitry shown in FIG. 13. The switch 282 and the two relays 288 and 290 operate independently and may be both on or off or singly on or off. If both are on. i.e. closed, the gain becomes extra high.

The automatic gain control logic circuitry shown in FIG. 13 is responsive to the output HR2 ... HR5 from the shift register 50 (FIG. 6) which are fed to a third comparator 296 as input bits A0, A1, A2 and A3 where they are compared to a fixed voltage reference as input bits B0, B1, B2 and B3. Logic gate 298 coupled to the A>B output line of the comparator 296 decodes the HR1 bit of the holding register 50 and the A>B signal if present which is inverted by the inverter 300 to provide an output signal corresponding to HR<7 meaning that HR is less than 7 volts whereupon flip-flop 302 is set when the $\overline{\text{YPK}}$ signal occurs after an X and Y slew sequence. When set, the flip-flop 302 provides a HIGH signal to the inverter 304 which activates relays 288 and 290 shown in FIG. 7. At this time a "high gain" lamp 306 is also illuminated. Logic gate 308 generates an $\overline{\text{AGAIN}}$ 4 signal which is applied to logic gate 74 shown in FIG. 5 creating another GO signal for restarting a new slew sequence.

Assuming the high/low gain setting was previously low, the YPKENA signal will be low via logic gate 310 since the $\overline{\text{YPKA}}$ signal would not have occurred and thus the timer flip-flop 91 shown in FIG. 5 will not have set. When the next $\overline{\text{YPK}}$ signal occurs, if the HR ... HR5 input is still less than the predetermined number which is set to be 7 volts, alarm flip-flop 312 will be set by the logic gate 314, causing an activating signal to be coupled to an audible alarm device, not shown, through a disable switch 316. At such time manual course acquisition is required. The $\overline{\text{AGAIN 4}}$ signal will not be generated at gate 308, since flip-flop 302 is high. Signals that will cause the flip-flop 302 and 312 to reset is the $\overline{\text{RESET}}$ signal from gate 70 shown in FIG. 5, while flip-flop 312 can additionally be reset by the $\overline{\text{AGAIN 5}}$ signal from the threshold logic gate 282 shown in FIG. 12 when switch 258C is closed.

Finally, if a threshold error has not reinitiated a new slew sequence before the timer flip-flop 91 shown in FIG. 5 is driven into a set state, a slew sequence is reinitiated when the down-counter 88 reaches the end of its count wherein an INTERVAL signal occurs at terminal C of the counter 88e shown in FIG. 6. An $\overline{\text{INTERVAL}}$ signal appears at the output of logic gate 218 which is fed to logic gate 70 of FIG. 5 to provide a $\overline{\text{RESET}}$ signal as well as a GO and $\overline{\text{GO}}$ signal. The slew sequence is then reinitiated in a manner previously described. It should be noted, however, that since the first flip-flop 64 is only set by the operator upon moving the switch 61 to the START position initially, the reinitiated slew sequences due to the threshold error or timer expiration is optimized once on each axis rather than twice as obtained when first starting.

Figure 14:
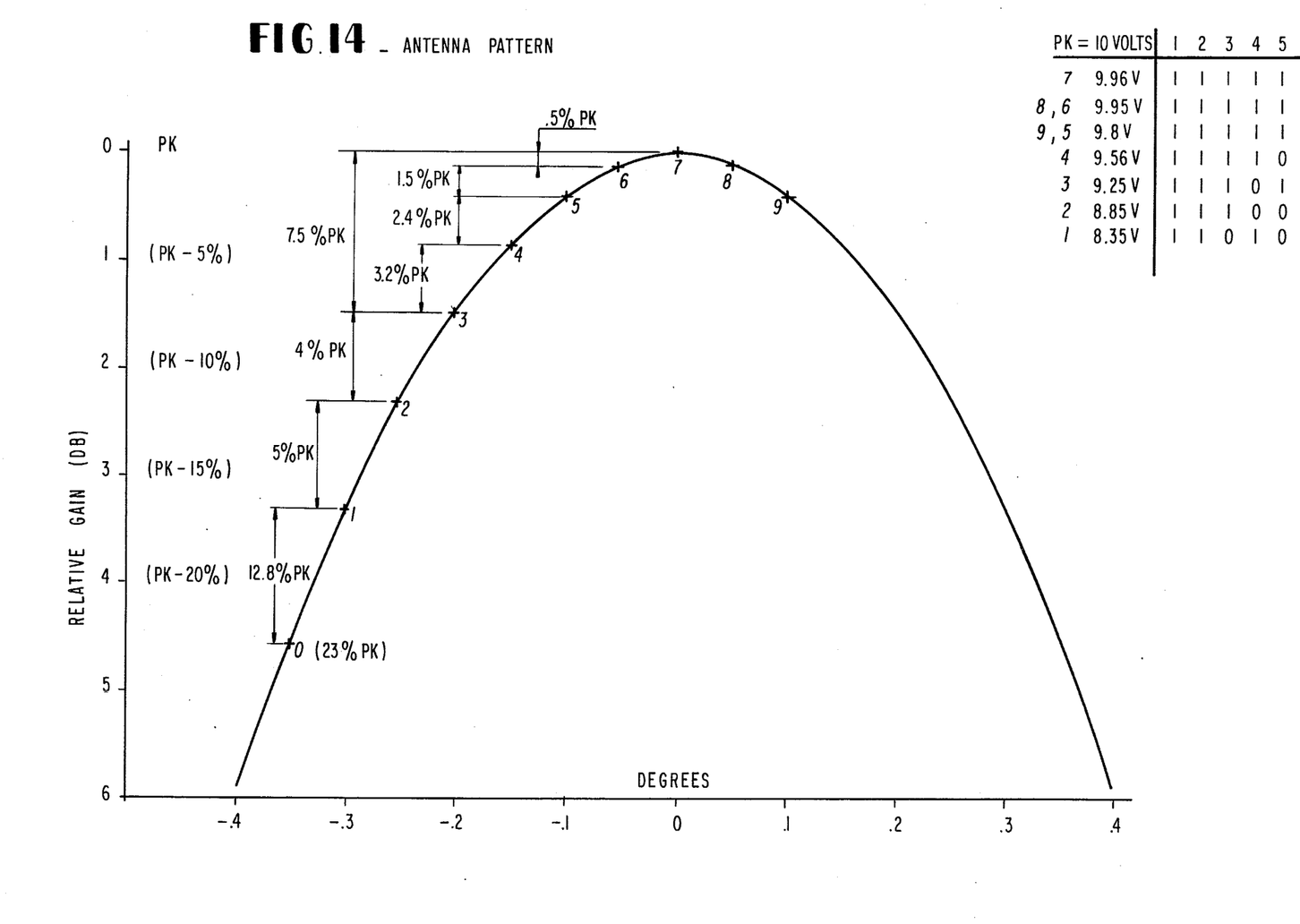
FIG. 14 is a diagram illustrative of a typical antenna pattern of the subject invention, being helpful in understanding the operational concept of the digital antenna controller apparatus shown in FIG. 2.

Thus referring to the antenna pattern shown in FIG. 14, the subject invention will operate to seek a maximum signal which corresponds approximately to point 7 after having passed approximately through points 5 and 6 as noted by the five bit digital word having all binary "ones" shown in the accompanying tabulation. Also note that points 8 and 9 correspond to points 6 and 5, respectively, which as noted before, the subject invention is adapted to stop a slewing operation where the maximum is reached and a slightly decreasing signal thereafter occurs making the system responsive approximately to points 8 and 9 so that an antenna drive motor reversal is thus obviated. When the peak signal that is obtainable from the receiver 26 results in an output of less than 10 volts at the output of the operational amplifier 52, a similar compare signal sequence to that depicted in FIG. 14 will occur with each point being represented by a different voltage and a different five bit digital word.

Thus what has been shown and described is what at present is considered to be the preferred embodiment of the subject invention. However, when desirable, a micro-processor may be used in lieu of the logic and comparators shown and described in FIGS. 5-13 being programmed however in such a way as to accomplish the functions embodied therein.

We claim as our invention:

1. A system for controlling a directive antenna for a communications receiver to periodically slew said antenna to a quasi-stationary remote communications signal source wherein the system includes a directive electromagnetic wave antenna having electrical drive means coupled thereto for being driven preferably along two separate axes together with manual antenna control means coupled to said drive means for providing course acquisition of said antenna to said remote signal source and communication signal receiver means coupled to said antenna providing an output signal indicative of the signal strength received by said antenna from said remote signal source, the improvement comprising:

digital antenna control means coupled to said drive means for automatically providing fine acquisition of said antenna to said signal source following course acquisition on at least one of two separate axes in response to the received signal, said digital antenna control means including, first means for periodically sampling said output signal from said receiver means and converting the samples resulting from said sampling into respective digital signal samples;

second means coupled to said conversion means for comparing one digital signal sample with the previous digital signal sample and generating a signal adapted to provide a continuous directional control signal coupled to said drive means in accordance with the comparison to cause said antenna to seek the maximum or peak signal strength of the received signal from said remote signal source and providing a stop command signal when a predetermined plurality of consecutive digital samples bear a predetermined value relationship to one another indicative that substantially maximum signal strength is being received by said antenna.

2. The system as defined by claim 1 wherein said first means comprises an analog sample and hold circuit coupled to said receiver means and an analog-to-digital converter coupled to said sample and hold circuit, said converter being periodically activated to provide a multi-bit digital output, and wherein said second means includes a multi-bit digital holding register and first digital logic circuit means coupled to said holding register and said analog-to-digital converter for comparing each digital sample with the preceding digital sample, and being operable to provide a reverse command signal when a predetermined number of digital samples are consecutively smaller than previous sample and a stop command signal when a predetermined number of digital samples are equal in value or begin to decrease following an increase in value.

3. The system as defined by claim 2 wherein said first digital logic circuit means is adapted to provide a reverse command signal or a stop command signal in response to at least three consecutive digital samples.

4. The system as defined by claim 2 wherein said digital antenna control means additionally includes timing logic circuit means and start/restart logic circuit means, wherein said start/restart logic circuit means is operable to provide an initial command signal to said drive means at the beginning of a slew sequence, and wherein said timing logic circuit means is adapted to generate and couple a strobe signal periodically to said analog-to-digital converter to cause the generation of said periodic digital samples.

5. The system as defined by claim 4 wherein said start/restart logic circuitry is operable to provide a second fine acquisition sequence to guarantee maximum signal acquisition at the start of operation of said system.

6. The system as defined by claim 4 and additionally including,
another digital register coupled to said holding register and adapted to receive a control signal from said timing logic circuitry for being loaded with the digital sample in said holding register when substantially maximum signal strength is received, and
second digital logic circuit means coupled to said holding register and said another digital register for comparing the digital sample in said another register to subsequent digital samples fed to said holding register from said analog-to-digital converter following fine acquisition and being operable to reactivate a new fine acquisition sequence when a predetermined number of digital samples is less in value than the value of the digital sample contained in said another register.

7. The system as defined by claim 2 wherein said digital antenna control means additionally includes third digital logic circuit means coupled to said first digital logic circuit means and being operable to determine the signal stability of digital samples within at least one predetermined sub-interval time period to temporarily disable said first digital logic circuit means in the event of non-stability of said digital samples.

8. The system as defined by claim 2 wherein said digital antenna control means additionally includes amplifier means having gain control means coupled between said antenna and said first circuit means.

9. The system as defined by claim 8 wherein said gain control means comprises manually operable gain means coupled to the input of said amplifier.

10. The system as defined by claim 9 and wherein said gain control means additionally includes automatic gain control means operated in response to a control signal applied thereto, and additionally including fourth digital logic circuit means, said fourth logic circuit means being coupled to said holding register and operative to compare the digital sample in said holding register against a predetermined fixed reference, and generate said control signal when the digital value of said sample falls below said fixed reference.

11. The system as defined by claim 2 wherein said second circuit means includes first slew logic circuit means for said at least one axis and being coupled to said first digital logic circuit means and being operable to generate drive signals coupled to said drive means for providing movement of said antenna in two directions along said at least one axis.

12. The system as defined by claim 11 wherein said second circuit means additionally includes second slew logic circuit means for the other axis of said two axes and being coupled to said first digital logic means and enabled by said first slew logic circuit means for providing drive signals coupled to said drive means for providing movement of said antenna in two directions along said other axis following a slew sequence on said at least one axis.

* * * * *